(12) United States Patent
Raghavan et al.

(10) Patent No.: US 11,937,097 B2
(45) Date of Patent: Mar. 19, 2024

(54) DIVERSITY IMPROVEMENT IN WIRELESS DEVICES WITH BEAM HOPPING

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 17/339,172

(22) Filed: Jun. 4, 2021

(65) Prior Publication Data

US 2022/0394497 A1 Dec. 8, 2022

(51) Int. Cl.
*H04W 16/28* (2009.01)
*H04B 7/06* (2006.01)
*H04B 17/318* (2015.01)

(52) U.S. Cl.
CPC .......... *H04W 16/28* (2013.01); *H04B 7/0617* (2013.01); *H04B 7/0695* (2013.01); *H04B 17/318* (2015.01)

(58) Field of Classification Search
CPC ... H04W 16/28; H04B 7/0617; H04B 7/0695; H04B 17/318; H04B 7/0408
See application file for complete search history.

(56) References Cited

U.S. PATENT DOCUMENTS

| | | | | |
|---|---|---|---|---|
| 2016/0065294 | A1* | 3/2016 | Kang | H04B 7/022 |
| | | | | 370/334 |
| 2017/0265111 | A1* | 9/2017 | Fan | H04B 7/024 |
| 2017/0290012 | A1* | 10/2017 | Hreha | H01Q 21/24 |
| 2019/0140811 | A1* | 5/2019 | Abedini | H04L 5/14 |
| 2019/0230544 | A1* | 7/2019 | Zhu | H04W 56/00 |
| 2020/0022000 | A1* | 1/2020 | Venugopal | H04W 16/28 |
| 2021/0242900 | A1* | 8/2021 | Manolakis | H04J 11/003 |
| 2021/0351835 | A1* | 11/2021 | Woo | H04B 7/0857 |
| 2022/0294507 | A1* | 9/2022 | Frenger | H04B 7/0413 |

(Continued)

FOREIGN PATENT DOCUMENTS

| | | | | |
|---|---|---|---|---|
| WO | WO-2017151876 | A1 * | 9/2017 | H04B 7/0408 |
| WO | 2020083509 | A1 | 4/2020 | |

OTHER PUBLICATIONS

"Performance Analysis of Distributed-Antenna Communication Systems Using Beam-Hopping Under Strong Directional Interference", Honglin Hu and Jinkang Zhu, Wireless Personal Communication, Spring 2005 (Year: 2005).*

(Continued)

*Primary Examiner* — Habte Mered
(74) *Attorney, Agent, or Firm* — ArentFox Schiff LLP

(57) ABSTRACT

A first wireless device may be configured to achieve diversity gain via beam hopping. In some aspects, the wireless device may configure a beam hopping mode for communications with a second wireless device, the beam hopping mode scheduling the first wireless device to switch between a plurality of candidate beam pairs over a plurality of symbols in accordance with a beam switching pattern, and beamform, during the communication with the second wireless device, a beam of each of the plurality of candidate beams in accordance with the beaming switching pattern.

30 Claims, 9 Drawing Sheets

(56) References Cited

U.S. PATENT DOCUMENTS

2022/0353940 A1\* 11/2022 Cirik .................... H04B 7/0695
2023/0085606 A1\* 3/2023 Shao .................... H04L 5/0012
370/329

OTHER PUBLICATIONS

Hu H., et al., "Performance Analysis of Distributed-Antenna Communication Systems Using Beam Hopping Under Strong Directional Interference", Wireless Personal Communications, Kluwer Academic Publishers, DO, vol. 32, No. 2, Jan. 1, 2005 (Jan. 1, 2005), pp. 89-105, XP019271874, The whole document.
International Search Report and Written Opinion—PCT/US2022/072323—ISA/EPO—dated Aug. 26, 2022.

\* cited by examiner

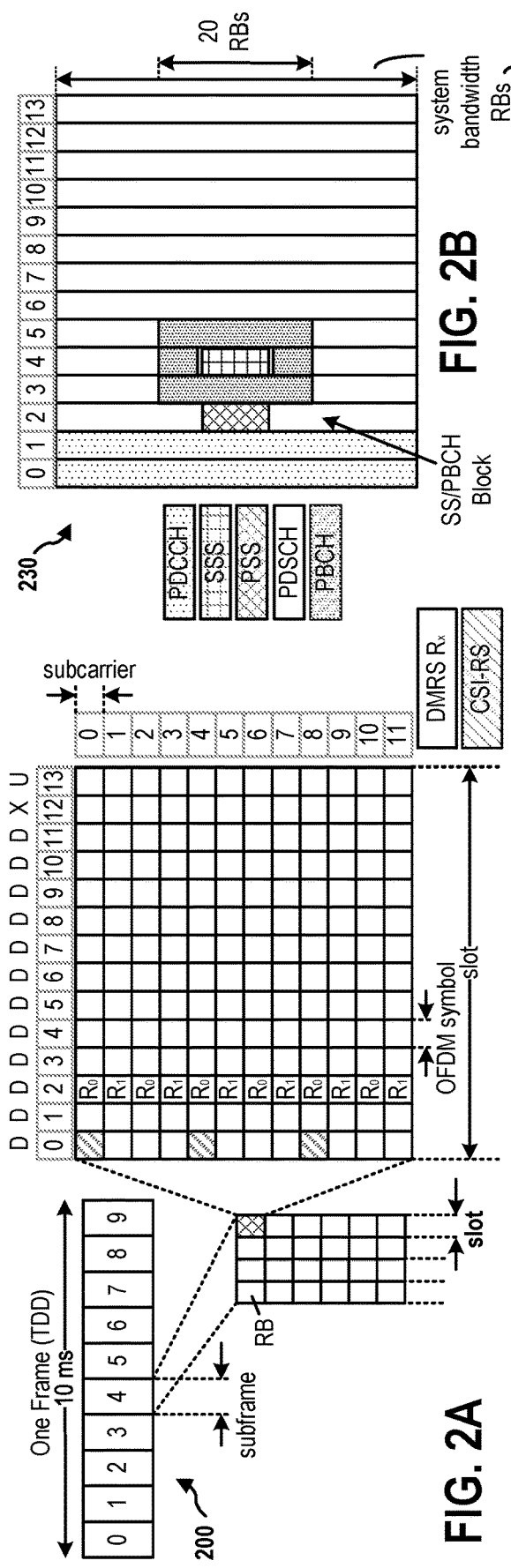
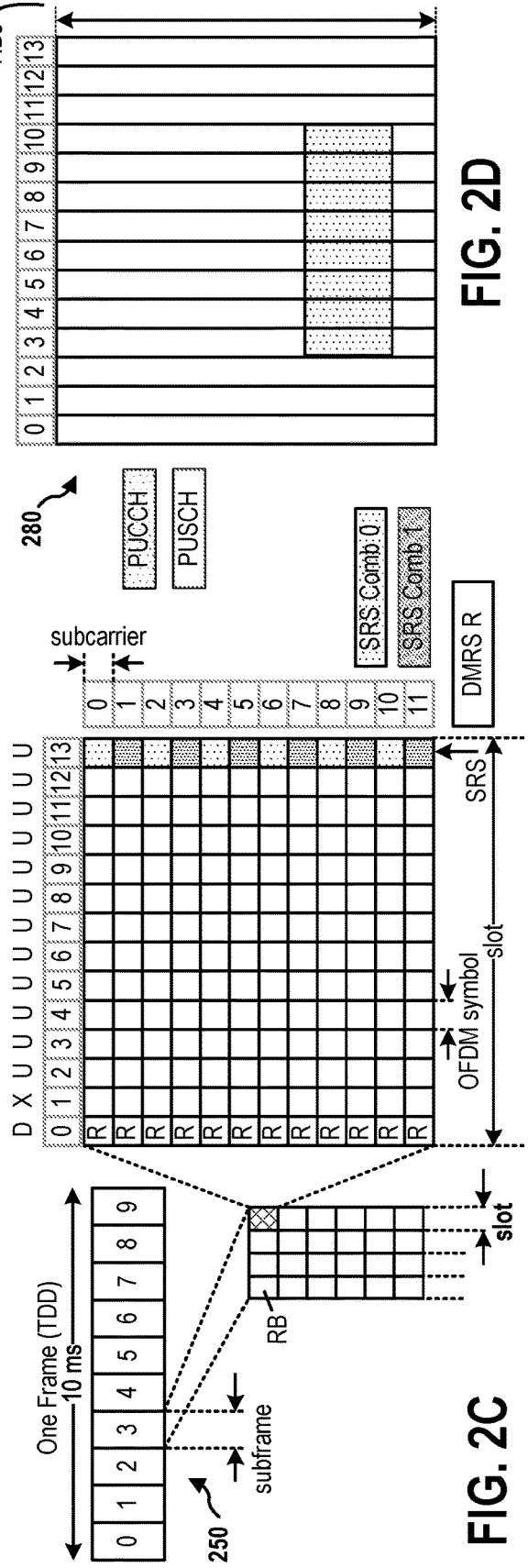

DIVERSITY IMPROVEMENT IN WIRELESS DEVICES WITH BEAM HOPPING

BACKGROUND

Technical Field

The present disclosure relates generally to wireless communication, and more particularly, to obtaining diversity improvement in wireless devices via beam hopping.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a first wireless device comprising configuring a beam hopping mode for communications with a second wireless device, the beam hopping mode scheduling the first wireless device to switch between a plurality of candidate beam pairs over a plurality of symbols in accordance with a beam switching pattern, and beamforming, during the communication with the second wireless device, a beam of each of the plurality of candidate beams in accordance with the beaming switching pattern.

The disclosure also provides an apparatus (e.g., a UE, a base station, etc.) including a memory storing computer-executable instructions and at least one processor configured to execute the computer-executable instructions to configure a beam hopping mode for communications with a second wireless device, the beam hopping mode scheduling the first wireless device to switch between a plurality of candidate beam pairs over a plurality of symbols in accordance with a beam switching pattern, and beamform, during the communication with the second wireless device, a beam of each of the plurality of candidate beams in accordance with the beaming switching pattern. In addition, the disclosure also provides an apparatus including means for performing the above method, and a computer-readable medium (e.g., a non-transitory computer-readable medium) storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
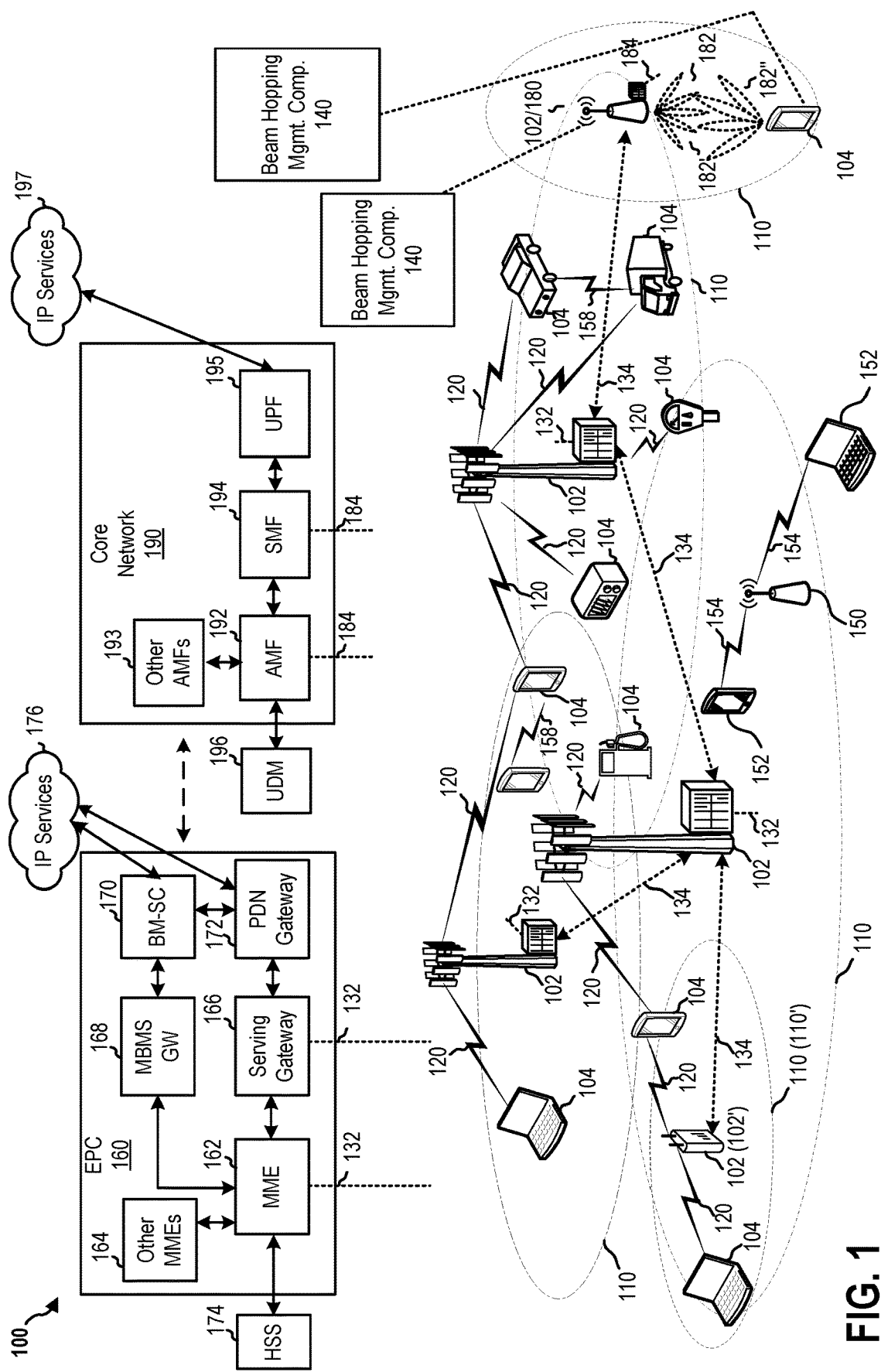
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for achieving diversity gain via beam hopping. As used herein, "beam hopping" may refer to adapting communication, by wireless devices, to switch transmission or reception among a plurality of beam pairs. In some aspects, two wireless devices may employ beam hopping for diversity gains. In particular, the two wireless devices may agree to a plurality of candidate beams and a beam switching pattern so that the wireless devices can synchronize their beam switching across symbols or sets of symbols during communication. In some aspects, the wireless devices may also combine frequency hopping with beam hopping. Accordingly, the present techniques disclose implementing beam hopping during communications between two wireless devices, thereby improving diversity gains and reducing narrowband interference effects.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a base station 102/180 and a UE 104 may each include a beam hopping management component 140 configured to manage beam hopping with each other. Further, the beam hopping management component 140 may facilitate synchronization of a plurality of candidate beams and a beam switching pattern between the base station 102/180 and the UE 104, and configure the base station 102/180 and the UE 104 to conduct communications using the plurality of candidate beams in accordance with the beam switching pattern.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102*a* may operate in a licensed or an unlicensed frequency spectrum. When operating in an unlicensed frequency spectrum, the small cell 102*a* may employ NR and use the same 5 GHz unlicensed frequency spectrum as used by the Wi-Fi AP 150. The small cell 102*a*, employing NR in an unlicensed frequency spectrum, may boost coverage to or increase capacity of the access network.

A base station 102, whether a small cell 102*a* or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and 2μ slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
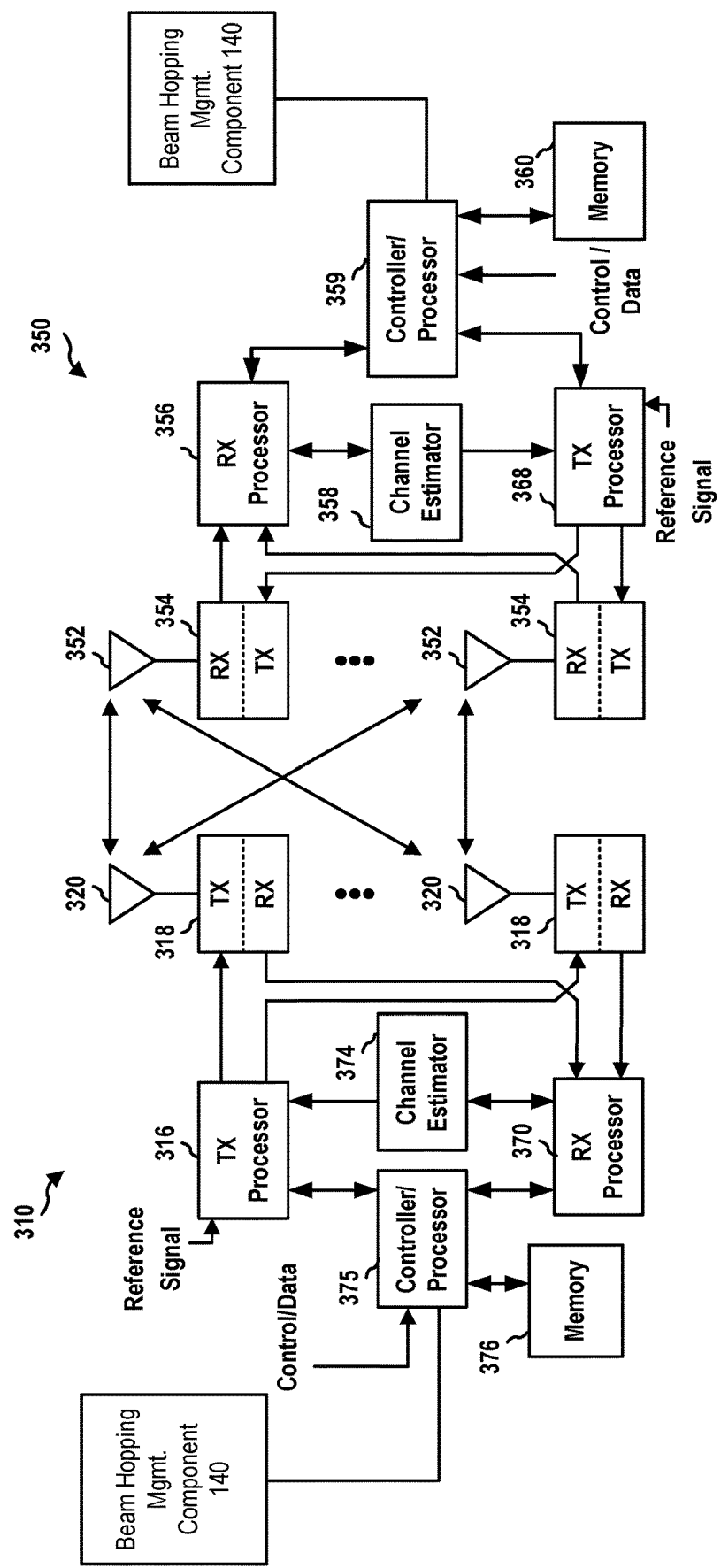
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the beam hopping management component 140 of FIG. 1.

In the base station 102/180, at least one of the TX processor 316, the RX processor 370, and the controller/processor 375 may be configured to perform aspects in connection with beam hopping management component 140 of FIG. 1.

In telecommunications, the delay spread is a measure of the frequency selectivity of a mobile communications channel. In some aspects, as used herein, "delay spread" may refer to the difference between the time of arrival of the earliest multipath component and the time of arrival of the last/last most relevant multipath components. In FR2, the delay spread may range between 10-100 ns in many environments. Coherence bandwidth captures the bandwidth over which the channel remains correlated in frequency, and is inversely proportional to delay spread. As a result, in FR2, coherence bandwidth may range from 10 MHz to 100 MHz. In scenarios where the coherence bandwidth is around 100 MHz, a maximum UE bandwidth corresponding to a component carrier (CC) allocation of 100 MHz may not provide satisfactory frequency diversity in some contexts. Accordingly, many systems have begun to implement frequency hopping to achieve frequency diversity gains. In particular, wireless devices may perform hop across bandwidth parts (BWPs) in different component carriers during communications. However, even with the implementation of frequency hopping across multiple component carriers, the frequency diversity may be insufficient. In addition, channel and interference conditions can vary between component carriers/bandwidth parts, which makes it difficult to predict potential diversity gains in frequency. Further, these factors will only increase with the adoption of FR4 and other operating bandwidths, and may limit the use of reduced capability (RedCap) 5G NR devices (e.g., wearables, industrial wireless sensors, and video surveillance, etc.). The present disclosure provides techniques for performing beam hopping with or instead of frequency hopping, thereby achieving diversity gains via spatial diversity.

Figure 4A:
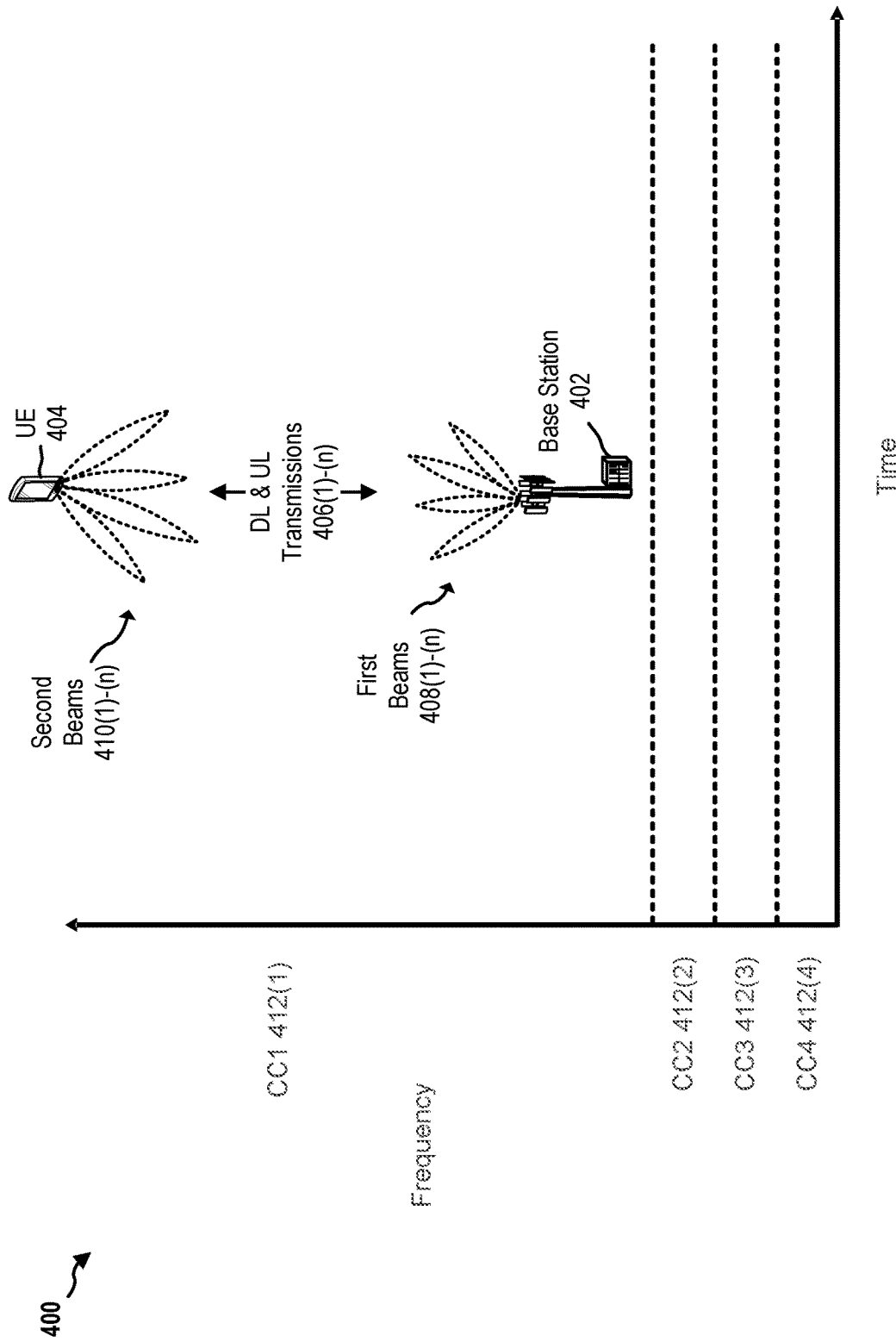
FIG. 4A is a diagram illustrating a first example of communications of a base station and a UE, in accordance with some aspects of the present disclosure.

The method of beam hopping is further described below with reference to FIGS. 4-7. FIG. 4A is a diagram illustrating a first example of communications of a base station and a UE. As illustrated in FIG. 4A, a system 400 may include a base station 402 (e.g., the base station 102/180) serving at least a UE 404 (e.g., the UE 102). Further, the base station 402 and the UE 404 may exchange DL and UL transmissions 406. In particular, the base station 402 may employ one or more first beams 408(1)-(n) for communication of the DL and UL transmissions 406, and the UE 404 may employ one or more second beams 410 for communication of the DL and UL transmissions 406. In addition, as described herein, the base station 402 and the UE 404 may perform beam hopping over the one or more first beams 408 and the one or more second beams 410 in a first component carrier 412(1). For example, a first beam of the one or more first beams 408 and a first beam of the one or more second beams 410 may form a first beam pair, a second beam of the one or more first beams 408 and a second beam of the one or more second beams 410 may form a second beam pair, and so forth. Further, the base station 402 and the UE 404 may hop between the different beams pairs across a plurality of symbols in accordance with a beam switching pattern, as illustrated in FIG. 4B.

Figure 4B:
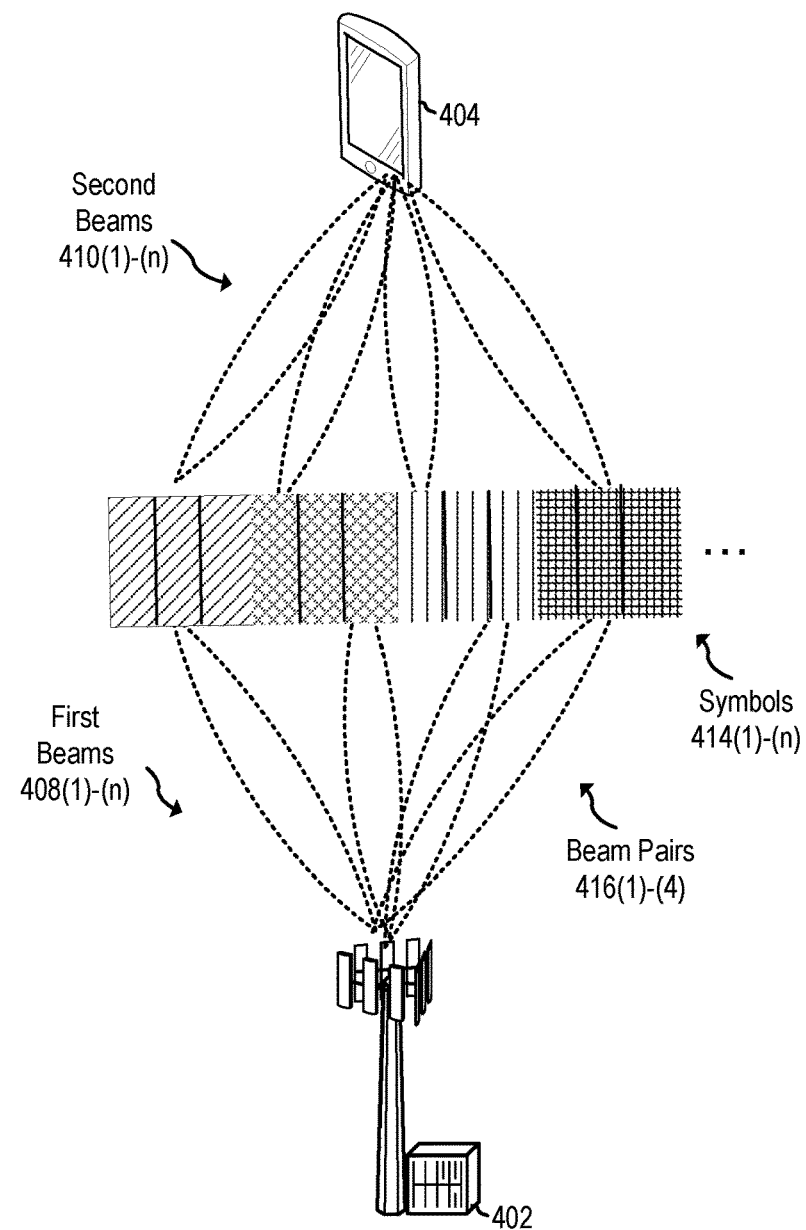
FIG. 4B is a diagram illustrating a second example of communications of a base station and a UE, in accordance with some aspects of the present disclosure.

FIG. 4B is a diagram illustrating a second example of communications of a base station and a UE. As illustrated in FIG. 4B, the one or more first beams 408 and the one or more second beams 410 may be used across a plurality of symbols 414(1)-(n) in accordance with a beam switching pattern. For example, a first beam pair 416(1) (i.e., the beam 408(1) and the beam 410(1)) may be used across one or more first symbols 414(1)-(3), a second beam pair 416(2) (i.e., the beam 408(2) and the beam 410(2)) may be used across one or more second symbols 414(4)-(6), a third beam pair 416(3) (i.e., the beam 408(3) and the beam 410(3)) may be used across one or more third symbols 414(7)-(9), and a fourth beam pair 416(4) (i.e., the beam 408(4) and the beam 410(4)) may be used a across one or more fourth symbols 414(10)-(12). Although FIG. 4B illustrates the employing a beam pair 416 for three symbols 414, a beam pair 416 may be used for any number of symbols. In some aspects, the beam switching over contiguous symbols to ensure time coherence of channels and reduce variation to selection of cluster. Further, in some aspects, the base station 402 and the UE 404 may employ a beam switching pattern where a first subset of the plurality of symbols 414 (e.g., a first slot) has a first beam switching pattern using a first subset of the beams pairs 416, and where a second subset of the plurality of symbols 414 (e.g., a second slot) has a second beam switching pattern using a second subset of the beams pairs 416. In some aspects, the beam hopping management component 140 may determine a frequency for switching to another beam pair 416 based on one or more attributes of the corresponding device. For instance, the beam hopping management component 140 may determine the frequency for beam switching based on a beam switching latency of the corresponding device and/or reducing power consumed and thermal energy generation. As an example, in some aspects, the beam hopping management component 140 may configure a corresponding device to use a beam pair for more than one symbol based on the beaming switching latency being greater than a predefined threshold indicating that the beam switch cannot be performed in time to transmit or receive during the next symbol.

Figure 4C:
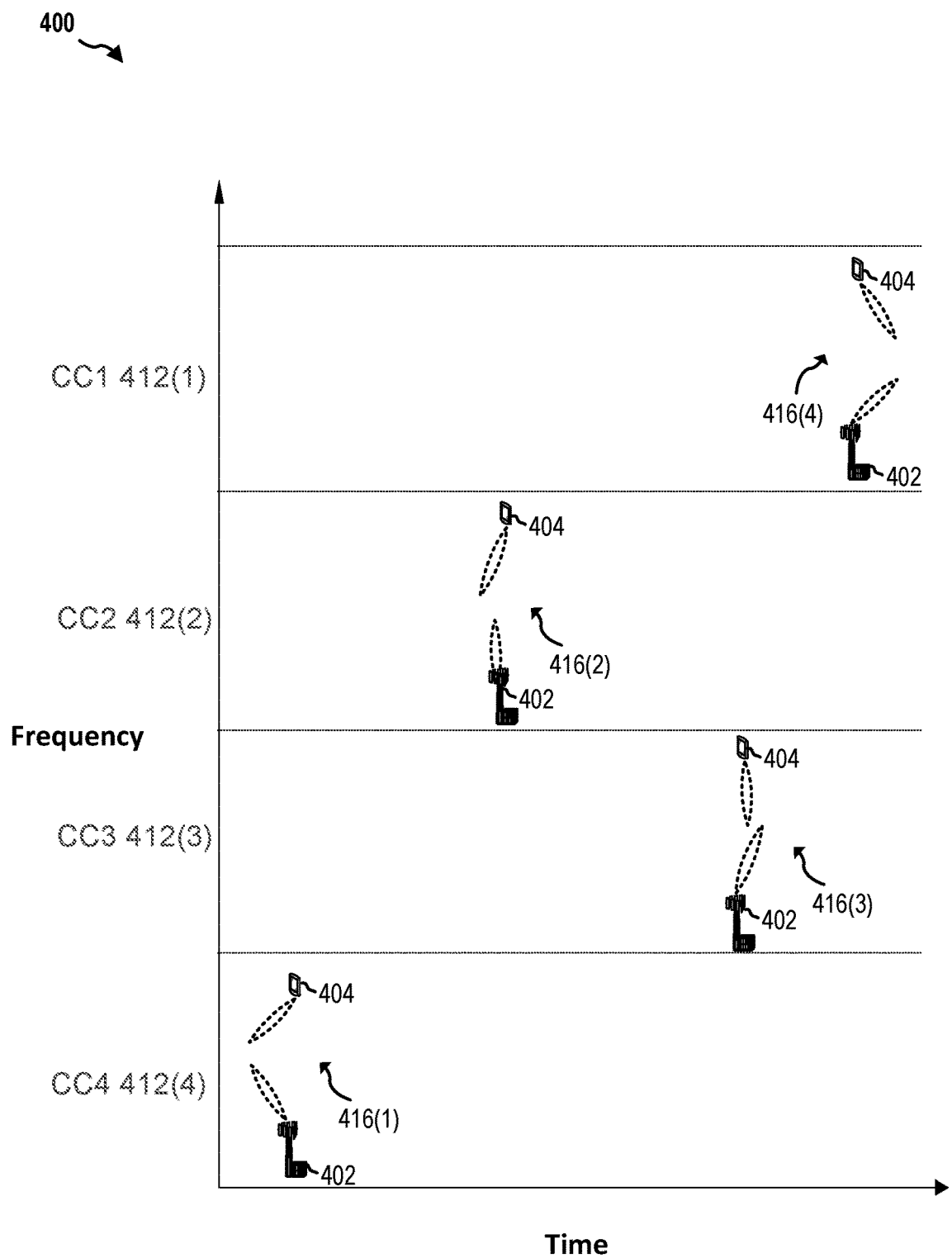
FIG. 4C is a diagram illustrating a third example of communications of a base station and a UE, in accordance with some aspects of the present disclosure.

FIG. 4C is a diagram illustrating a third example of communications of a base station and a UE. In some aspects, as described herein, the base station 402 may perform beam hopping over the one or more first beams 408 and the UE 404 may perform beam hopping over the one or more second beams 410, while frequency hopping over a plurality of component carriers 412(1)-(4). For example, the first beam pair 416(1) may use the fourth component carrier 412(4), the second beam pair 416(2) may use the second component carrier 412(2), the third beam pair 416(3) may use the third component carrier 412(3), and a fourth beam pair 416(4) use the first component carrier 412(1). Although FIG. 4C illustrates the base station 402 and the UE 404 hopping across four component carriers 412, the beams pairs may be used for any number of component carriers. Further, the base station 402 and the UE 404 may hop between the different beams pairs and component carriers in accordance with a beam switching pattern.

Figure 5:
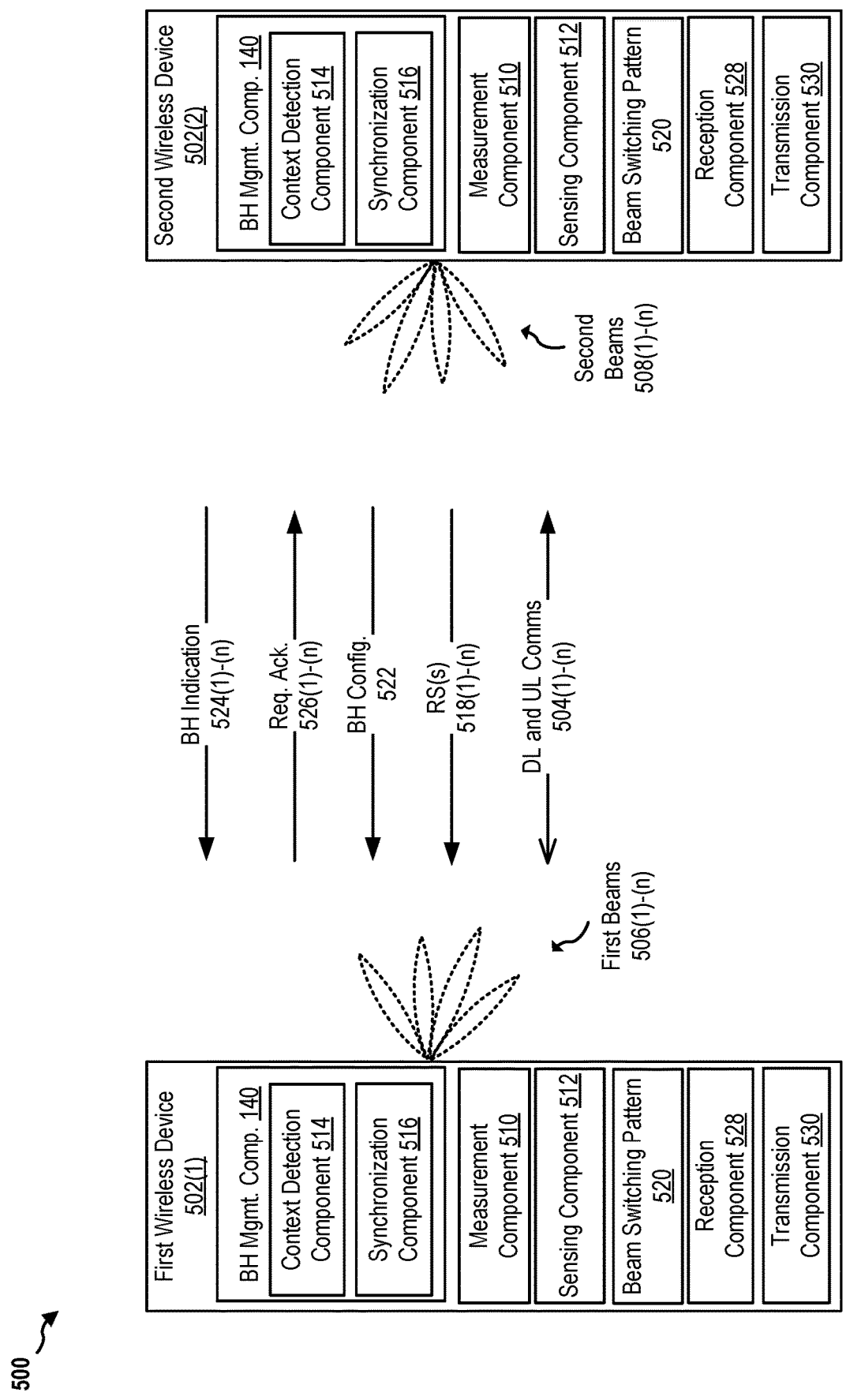
FIG. 5 is a diagram illustrating an example of communications and components of wireless devices, in accordance with some aspects of the present disclosure.

FIG. 5 is a diagram illustrating example communications and components of wireless devices 502(1)-(2). As illustrated in FIG. 5, the system 500 may include a first wireless device 502(1) (e.g., the base station 102/180, the base station 402, the UE 104, or the UE 404), and a second wireless device 502(2) (e.g., the base station 102/180, the base station 402, the UE 104, or the UE 404). Although FIG. 5 illustrates two wireless devices 502(1)-(2), the system 500 may include any number of wireless device performing beam hopping with each other. Further, the wireless devices 502(1)-(2) may be configured for beamformed wireless communications. For example, the first wireless device 502(1) may exchange DL and UL transmissions 504(1)-(n) with the second wireless device 502(2). Additionally, the first wireless device 502(1) may employ one or more first beams 506(1)-(n) for communication of the DL and UL transmissions 504(1)-(n), and the second wireless device 502(2) may employ one or more second beams 508(1)-(n) for communication of the DL and UL transmissions 504(1)-(n). Further, the one or more first beams 506(1)-(n) and the one more second beams 508(1)-(n) may include transmit and receive beams. In some aspects, wireless devices 502(1)-(2) may be a 5G new radio devices operating at an mmWave frequency above 24.25 GHz. Furthermore, in some aspects, at least one of the wireless devices 502(1)-(2) may be a RedCap device deployed indoors where the physical environment (e.g., reflective structure, nominal distances between wireless devices, etc.) may support using other beams in addition to the strongest beam pair.

As illustrated in FIG. 5, a wireless device 502 (e.g., the wireless device 501(1)) may include the beam hopping management component 140, a measurement component 510, and a sensing component 512. The beam hopping management component 140 may be configured to manage beam hopping during transmission and reception of the DL and UL transmissions 504(1)-(n). The beam hopping management component 140 may include a context detection component 514, and a synchronization component 516.

The measurement component 510 may be configured to measure one or more sources to determine one or more measurement values. For example, the measurement component 510 may be configured to determine signal information (e.g., signal strength measurements) associated with the beams 506 and the beams 508, e.g., beam pairs formed by beams 506 and 508. In some aspects, the signal information for a beam pair may be determined based on measurement of a reference signal 518 received from another wireless device 502 (e.g., the wireless device 501(2)). Some examples of signal strength measurements include received signal strength indicator (RSSI) measurements, reference signal received power (RSRP) measurements, signal-to-interference-plus-noise ratio (SINR) measurements, and/or a channel quality information (CQI) measurements. In some aspects, a beam pair of a wireless device 502 may be identified as a candidate beam pair (e.g., a beam pair including a beam from the beams 506 and 508) for beam hopping based upon the measurement component 510 determining that the beam pair has a signal strength above a predefined threshold (e.g., a configured signal strength threshold). In some examples, the predefined threshold is used to ensure that the candidate beam pairs will be sufficient for communication of the DL and UL transmissions 504(1)-(n) even though a candidate beam pair may not be the strongest beam pair. Further, the measurement component 510 may determine steering angles of the beams 506 and 508 of the wireless devices 502(1)-(2). In addition, in some aspects, a beam may be used for a candidate beam pair for beam hopping based upon the measurement component 510 determining that the difference between a steering angle of the beam and any steering angle of the other beams of the wireless device 502 is greater than a predefined threshold (e.g., a configured steering angle difference). In some examples, the predefined threshold is used to ensure that the beams of the candidate beam pairs are sufficiently spaced out in order to avoid confusion/ambiguity at a destination wireless device 502 as to the source of the beam corresponding to the received signal (e.g., the DL and UL transmissions 504(1)-(n)) and to produce post-beamformed channel impulse responses that are uncorrelated with each other. In some aspects, if the steering angle difference between the two beams is less than a predefined threshold, the wireless device 502 may only employ one of the beams for the beam pairs of the wireless device 502 can perform beam hopping for transmission or reception without distinct beams.

The sensing component 512 may be configured to determine a beam that is currently being used by the other wireless device 502 at a particular period in time. For example, the sensing component 512 of the wireless device 502(1) may perform a scanning process to determine which beam out of the beams 508(1)-(n) is being beamformed by the wireless device 502(1) with respect to one or more symbols. In some aspects, the beam switching pattern 520 may be determined using the sensing component 512. For example, the sensing component 512 may be configured to determine the beams used during a sequence of symbols, and/or the order of hopping between the beams.

The context detection component 514 may be configured to determine one or more contexts of the wireless device 502, and initiate a diversity gain technique (e.g., a beam hopping mode, beam and frequency hopping mode) in response to the identified one or more contexts (e.g., beam hopping context, frequency hopping context). In some aspects, the context detection component 514 may determine whether or not to employ beam hopping. For example, the context detection component 514 may include a motion sensor configured to determine motion information for the wireless device 502, and initiate beam hopping based on the motion information of the wireless device 502 indicating that the mobility and/or rate of mobility of the wireless device 502 is less than or equal to a predefined threshold. For example, in some aspects, the wireless device 502 may transmit a beam hopping indication 524 to the second wireless device 502 based upon the context detection component 514 determining that the mobility of the wireless device 502 is less than or equal to a predefined threshold.

Once the context detection component 514 determines to employ beam hopping, the context detection component 514 may further determine whether to employ beam hopping with or without frequency hopping. In some aspects, the context detection component 514 may determine device information and/or environmental information, and determine whether to initiate beam hopping with or without frequency hopping based on the device information and/or environmental information. For example, the wireless device 502 may determine an expected power consumption value and/or an expected thermal energy value resulting from employing beam hopping and frequency hopping. Further, the context detection component 514 may initiate beam hopping without frequency hopping with the wireless device 502 in response to the expected power consumption value and/or expected thermal energy value being greater than a predefined threshold and initiate beam hopping with frequency hopping in response to the expected power consumption value and/or expected thermal energy value being less than or equal to the predefined threshold. As another example, the wireless device 502 may determine an expected frequency switching latency value, and initiate beam hopping with frequency hopping in response to the expected latency value being less than the predefined threshold (i.e., a frequency hopping context). As another example, the wireless device 502 may determine that the wireless device 502 has a plurality of beams (e.g., the beams 506(1)-(n) or the beams 508(1)-(n)) capable of performing beam hopping in a predefined channel and initiate beam hopping with the wireless device 502 in response to identifying the viable beams. As yet another example, the context detection component 514 may determine interference across frequencies in a physical environment including the wireless device 502, and initiate beam hopping with frequency hopping in response to the determined interference being below a predefined threshold.

The synchronization component 516 may be configured to synchronize beam hopping with the other wireless device 502. In some aspects, the synchronization component 516 may determine the one or more locals beams that will be used for performing beam hopping with the other wireless device 502, and a beam switching pattern to be employed for performing beam hopping with the other wireless device 502. For example, the synchronization component 516 may determine which beam pairs may be used for beam hopping based on corresponding measurement values. In particular, the synchronization component 516 may receive measurement values (e.g., signal strengths, steering angles, etc.) for the plurality of beam pairs of the wireless devices 502(1)-(2), and each beam pair having a measurement value above a predefined threshold may be identified as a candidate beam pair. Further, in some aspects, the synchronization component 516 may transmit beam hopping configuration 522 identifying the candidate beams to the other wireless device 502. In some aspects, the beam hopping configuration 522 may include a beam switching pattern 520 that indicates a schedule for synchronized switching between the candidate beam pairs. Further, in some aspects, the beam switching pattern 520 may further indicate to a schedule for synchronized switching between component carriers.

In addition, in some aspects, the synchronization component 516 may receive the beam hopping configuration 522 from the other wireless device 502. The beam hopping configuration 522 may identify candidate beam pairs determined by the other wireless device 502. In some aspects, the beam hopping configuration 522 received from the other wireless device 502 may include a beam switching pattern 520 that indicates a schedule for synchronized switching between the candidate beam pairs. In some aspects, the beam switching pattern 520 may indicate the symbols at which a beam pair switch will occur, and the particular beam pair that will be employed during each switch. Further, the beam switching pattern 520 that indicates a schedule for synchronized switching between the component carriers.

Alternatively, in some other aspects, the beam hopping configuration 522 received from the other device 502 may not fully describe the beam switching pattern 520 (e.g., the beam hopping configuration 522 may only indicate the symbols at which a beam pair switch will occur), and the synchronization component 516 may employ the sensing component 512 to determine when each of the candidate beam pairs identified in the beam hopping configuration 522 is being used in order to generate the beam switching pattern 520.

Further in some aspects, in response to the context detection component 514 determining that beam hopping should be initialized, the beam hopping management component 140 may transmit a beam hopping indication 524 to the other wireless device 502. Further, in some aspects, the other wireless device 502 may respond with a beam hopping acknowledgment 526. The beam hopping indication 524 or the beam hopping acknowledgment 526 may include the beam hopping configuration 522 identifying the candidate beam pairs and/or the beam switching pattern 520. For example, in response to the beam hopping indication 524, the beam hopping management component 140 may employ the synchronization component 516 to determine the beam hopping configuration 522, and transmit the beam hopping configuration 522 to the other wireless device 502 prior to communication of DL and UL communications 506(1)-(n) via beam hopping. In some other examples, a beam hopping management component 140 may receive the beam hopping indication 524 and employ the synchronization component 516 to determine the beam hopping configuration 522 during communication of the DL and UL communications 504(1)-(n) via beam hopping. For instance, the DL and UL communications 504(1)-(n) may indicate the beam hopping configuration 522. In addition, in some aspects, the beam hopping indication 523, the beam hopping acknowledgment 526, the beam hopping configuration 522, and/or the beam switching pattern 520 may be transmitted as DCI and/or UCI.

In addition, the wireless device 502 may include a reception component 528 and a transmission component 530. The transmission component 530 may be configured to generate signals for transmission operations and sensing as described herein. The transmission component 530 may include, for example, a radio frequency (RF) transmitter for transmitting the signals described herein. The reception component 528 may include, for example, a RF receiver for receiving the signals described herein. In an aspect, the reception component 528 and the transmission component 530 may be co-located in a transceiver (e.g., the transceiver 610 shown in FIG. 6).

Figure 6:
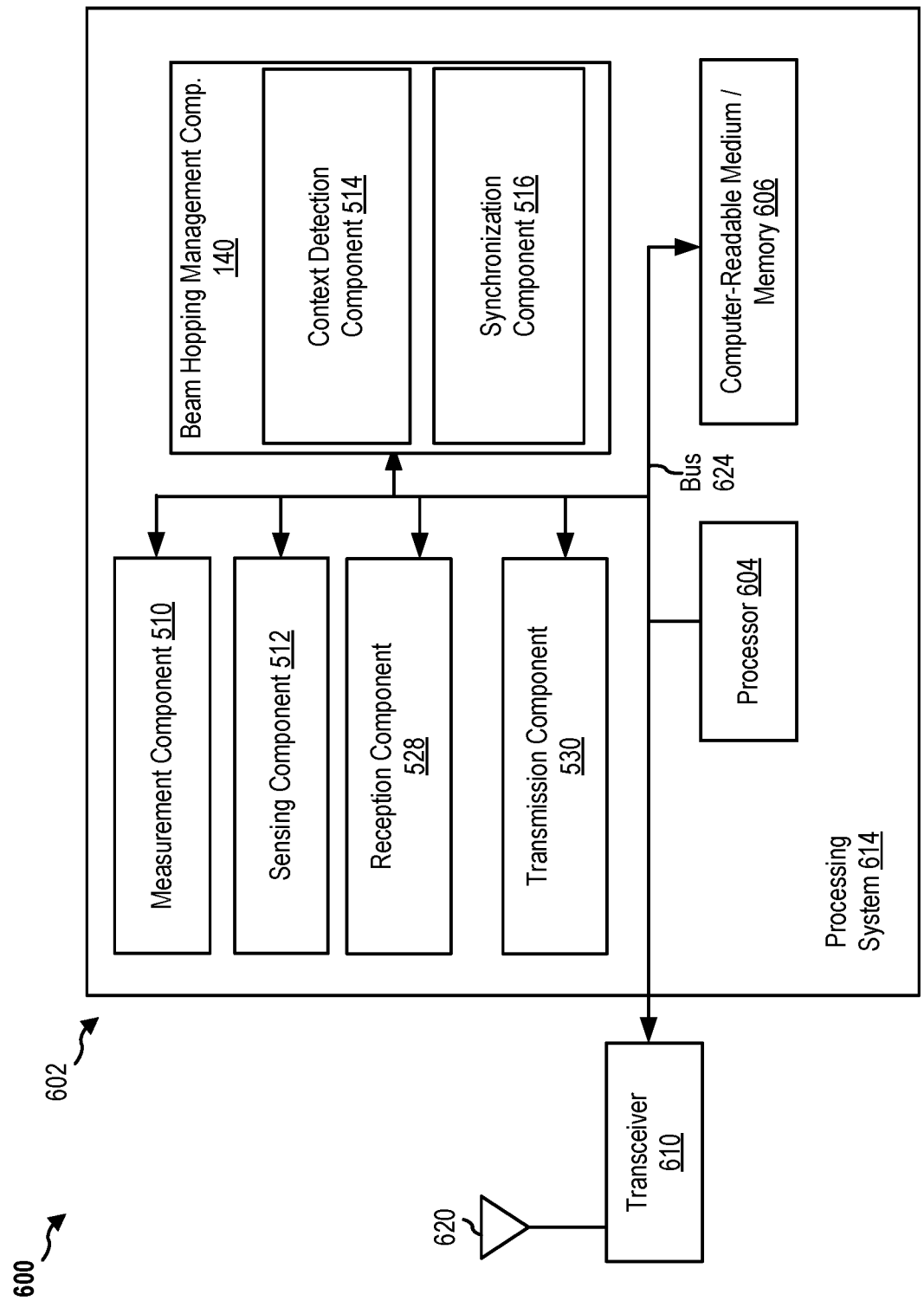
FIG. 6 is a diagram illustrating an example of a hardware implementation for a wireless device employing a processing system, in accordance with some aspects of the present disclosure.

FIG. 6 is a diagram 600 illustrating an example of a hardware implementation for a wireless device 602 (e.g., the base station 102/180, the base station 402, UE 104, UE 404, etc.) employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the beam hopping management component 140, and the computer-readable medium/memory 606. The bus 624 may also link various other circuits such as timing sources, peripherals, voltage regulators, and power management circuits, which are well known in the art, and therefore, will not be described any further.

The processing system 614 may be coupled with a transceiver 610. The transceiver 610 may be coupled with one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 528. The reception component 528 may receive the DL and UL communications 504(1)-(n), the reference signals 518(1)-(n), the beam hopping configuration 522, the beam hopping indication 524, and the beam hopping acknowledgment 526. In addition, the transceiver 610 receives information from the processing system 614, specifically the transmission component 530, and based on the received information, generates a signal to be applied to the one or more antennas 620. Further, the transmission component 530 may transmit the DL and UL communications 504(1)-(n), the reference signals 518(1)-(n), the beam hopping configuration 522, the beam hopping indication 524, and the beam hopping acknowledgment 526

The processing system 614 includes a processor 604 coupled with a computer-readable medium/memory 606 (e.g., a non-transitory computer readable medium). The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes the beam hopping management component 140, the measurement component 510, and the sensing component 512. The aforementioned components may be software components running in the processor 604, resident/stored in the computer readable medium/memory 606, one or more hardware components coupled with the processor 604, or some combination thereof. The processing system 614 may be a component of the base station 310 and may include the memory 376 and/or at least one of the TX processor 316, the RX processor 370, and the controller/processor 375. Alternatively, the processing system 614 may be the entire base station (e.g., see 310 of FIG. 3, 402 of FIG. 4). Additionally, the processing system 614 may be a component of the UE 350 and may include the memory 360 and/or at least one of the TX processor 368, the RX processor 356, and the controller/processor 359. Alternatively, the processing system 614 may be the entire UE (e.g., see 350 of FIG. 3, 404 of FIG. 4).

The aforementioned means may be one or more of the aforementioned components of the wireless device 602 and/or the processing system 614 of the wireless device 602 configured to perform the functions recited by the aforementioned means. As described supra, the processing system 614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. Additionally, the aforementioned means may be one or more of the aforementioned components of the wireless device 602 and/or the processing system 614 of wireless device 602 configured to perform the functions recited by the aforementioned means. As described supra, the processing system 614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 7:
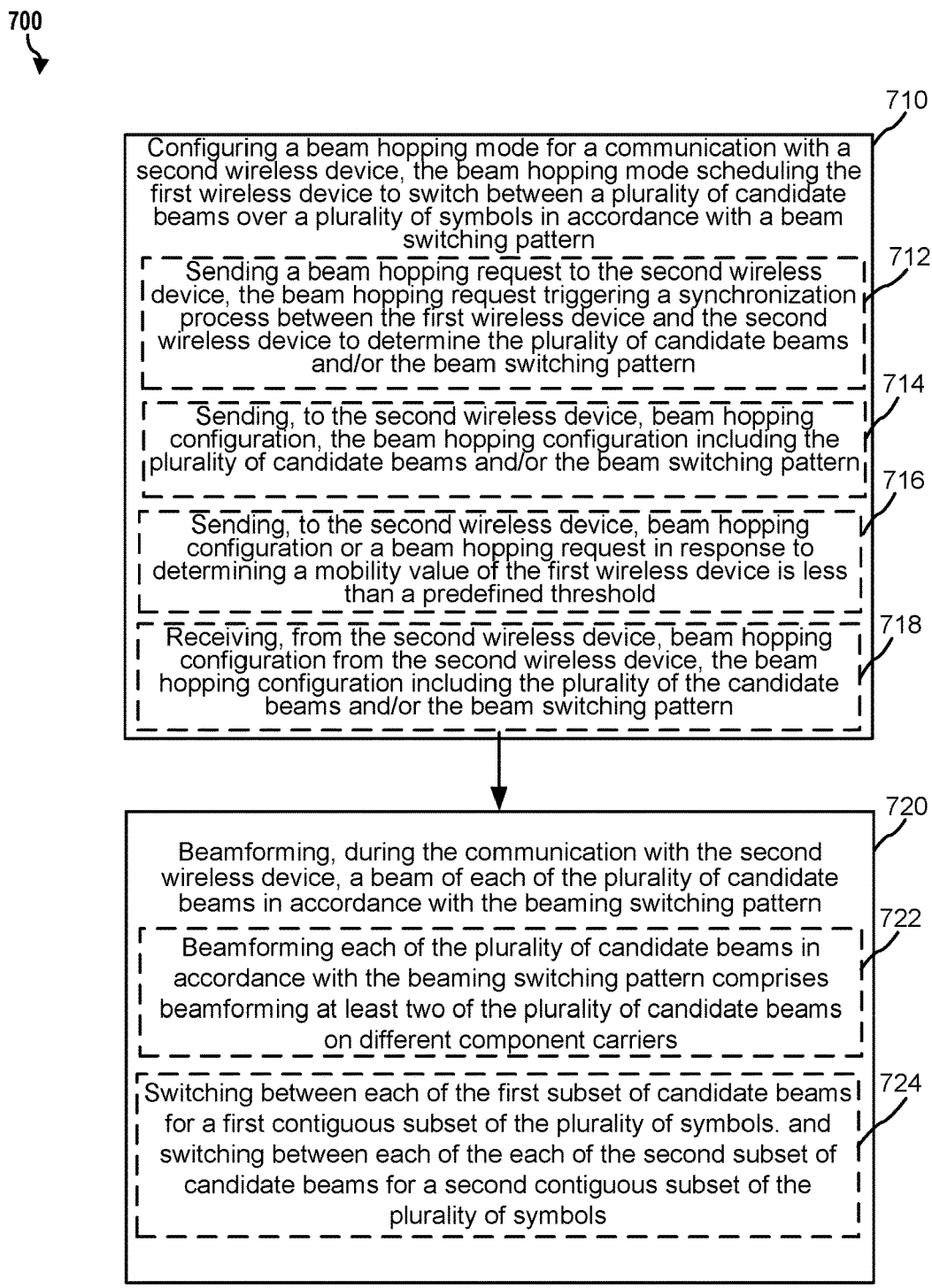
FIG. 7 is a flowchart of an example method of employing beam hopping in a wireless device, in accordance with some aspects of the present disclosure.

FIG. 7 is a flowchart of a method 700 for limiting TX power for FDD for HPUE, in accordance with some aspects of the present disclosure. The method may be performed by a wireless device (e.g., the wireless device 502, the base station 102, which may include the memory 376 and which may be the entire base station or a component of the base station, such as beam hopping management component 140, the TX processor 316, the RX processor 370, and/or the controller/processor 375; the base station 402, the UE 104, which may include the memory 360 and which may be the entire UE 104 or a component of the UE 104, such as the beam hopping management component 140, the TX processor 368, the RX processor 356, and/or the controller/processor 359; and/or the UE 404).

At block 710, the method 700 may include configuring a beam hopping mode for communications with a second wireless device, the beam hopping mode scheduling the first wireless device to switch between a plurality of candidate beam pairs over a plurality of symbols in accordance with a beam switching pattern. For example, the beam hopping management component 140 may configure the wireless device 502(1) to perform synchronized beam hopping with the wireless devices 502(2) using beam pairs formed from the first beams 506 and the second beams 508 in accordance with a beam switching pattern 520.

At sub-block 712, the block 710 may optionally include sending a beam hopping indication to the second wireless device, the beam hopping indication triggering a synchronization process between the first wireless device and the second wireless device to determine the plurality of candidate beams and/or the beam switching pattern. For example, in some aspects, the wireless device 502(1) may transmit the beam hopping indication 524 to the wireless device 502(2). Further, the transmission of the beam hopping indication 524 may cause the synchronization components 516(1)-(2) of the wireless devices 502(1)-(2) to perform a synchronization process to determine the first beams 506 and the second beams 508 to use in candidate beam pairs, and the beam switching pattern 520.

At sub-block 714, the block 710 may optionally include sending, to the second wireless device, beam hopping configuration, the beam hopping configuration including the plurality of candidate beams and/or the beam switching pattern. For example, the beam hopping management component 140 may determine the beam pairs formed from the first beams 506 and the second beams 508, the beam switching pattern 520, and transmit the beam hopping configuration 522 including the beam pairs and the beam switching pattern 520 to the second wireless device 502(2).

At sub-block 716, the block 710 may optionally include sending, to the second wireless device, beam hopping configuration or a beam hopping indication in response to determining a mobility value of the first wireless device is less than a predefined threshold. For example, in some aspects, the wireless device 502(1) may transmit the beam hopping indication 524 to the second wireless device 502(1) in response to the context detection component 514 determining that beam hopping should be performed. In some aspects, the context detection component 514 may determine that beam hopping should be performed between the first and second wireless devices 502(1)-(2) based on a mobility value determined by the context detection component 514 being less than a predefined threshold.

At sub-block 718, the block 710 may optionally include receiving, from the second wireless device, beam hopping configuration from the second wireless device, the beam hopping configuration including the plurality of the candidate beams and/or the beam switching pattern. For example, in some aspects, the first wireless device 502(1) may receive the beam hopping configuration 522 from the second wireless device 502(2). Further, the beam hopping configuration 522 may include candidate beams formed from the first beams 506 and the second beams 508, and the beam switching pattern 520 to the second wireless device 502(2).

Accordingly, the base station 102/180, the UE 104, the base station 402, the UE 404, the wireless device 502, the RX processor 370, the controller/processor 375, the TX processor 368, and/or the RX processor 356 executing the beam hopping management component 140 may provide means for configuring a beam hopping mode for communications with a second wireless device, the beam hopping mode scheduling the first wireless device to switch between a plurality of candidate beam pairs over a plurality of symbols in accordance with a beam switching pattern.

At block 720, the method 700 may include beamforming, during the communication with the second wireless device, a beam of each of the plurality of candidate beams in accordance with the beaming switching pattern.

For example, the beam hopping management component 140 may be configured to manage transmission of the DL and UL communications 504(1)-(n) to the second wireless device 502(2) while switching between the first beams 506(1)-(n) in accordance with the beam switching pattern 520.

At sub-block 722, the block 720 may optionally include beamforming a beam of each of the plurality of candidate beams in accordance with the beaming switching pattern comprises beamforming at least two of the plurality of candidate beams on different component carriers. For example, in some aspects, the beam hopping management component 140 may be configured to manage transmission of the DL and UL communications 504(1)-(n) using beam hopping and frequency hopping as described with respect to FIG. 4C. For example, the beam hopping management component 140 may be configured to manage transmission of the DL and UL communications 504(1)-(n) to the second wireless device 502(2) while switching between the first beams 506(1)-(n) and switching between a plurality of component carriers (e.g., the component carriers 412(1)-(4)), in accordance with the beam switching pattern 520.

At sub-block 724, the block 720 may optionally switching between each of the first subset of candidate beams for a first contiguous subset of the plurality of symbols, and switching between each of the each of the second subset of candidate beams for a second contiguous subset of the plurality of symbols. For example, the beam hopping management component 140 may be configured to manage transmission of the DL and UL communications 504(1)-(n) to the second wireless device 502(2) while switching between a first subset of the first beams 506(1)-(n) for a first plurality of symbols and switching between a second subset of the first beams 506(1)-(n) for a second plurality of symbols, in accordance with the beam switching pattern 520.

Accordingly, the base station 102/180, the UE 104, the base station 402, the UE 404, the wireless device 502, the RX processor 370, the controller/processor 375, the TX processor 368, and/or the RX processor 356 executing the beam hopping management component 140 may provide means for beamforming, during the communication with the second wireless device, a beam of each of the plurality of candidate beams in accordance with the beaming switching pattern.

In an additional or alternative aspect, the method 700 further comprises measuring a signal strength of each of the plurality of candidate beams, and selecting the plurality of candidate beams based on the signal strength of each of the plurality of candidate beams being greater than a predefined threshold. For example, the measurement component 510 may determine the signal strength of a beam 506, and the beam hopping management component 140 may determine that the beam 506 is a candidate beam for beam hopping based on the signal strength being greater than a predefined threshold. Accordingly, the UE 104, the UE 404, UE 502, the TX processor 368, the RX processor 356, and/or the controller/processor 359 executing the measurement component 510 and the beam hopping management component 140 may provide means for measuring a signal strength of each of the plurality of candidate beams, and selecting the plurality of candidate beams based on the signal strength of each of the plurality of candidate beams being greater than a predefined threshold.

In an additional or alternative aspect, the method 700 further comprises measuring a first steering angle of the first candidate beam, measuring a second steering angle of the second candidate beam, and selecting the first candidate beam and the second candidate beam based on a difference between the first steering angle and the second steering angle being greater than a predefined threshold. For example, the measurement component 510 may determine the steering angle of the first beams 506(1)-(n), and the beam hopping management component 140 may determine that the first beams 506(1)-(n) are candidate beams for beam hopping based on the difference in the steering angles of each of the first beams 506(1)-(n) being greater than a predefined threshold. Accordingly, the UE 104, the UE 404, UE 502, the TX processor 368, the RX processor 356, and/or the controller/processor 359 executing the measurement component 510 and the beam hopping management component 140 may provide means for measuring a first steering angle of the first candidate beam, measuring a second steering angle of the second candidate beam, and selecting the first candidate beam and the second candidate beam based on a difference between the first steering angle and the second steering angle being greater than a predefined threshold.

In an additional or alternative aspect, the method 700 further comprises generating the beam switching pattern based on power consumption and/or thermal overhead observed at the first wireless device. For example, the synchronization component 516 may determine a beam switching pattern having power consumption and/or thermal overhead observed at the first wireless device below a predefined threshold. Accordingly, the UE 104, the UE 404, UE 502, the TX processor 368, the RX processor 356, and/or the controller/processor 359 executing the beam hopping management component 140 may provide means for generating the beam switching pattern reducing power consumption and/or thermal overhead observed at the first wireless device.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a first wireless device, comprising, comprising: configuring a beam hopping mode for communications with a second wireless device, the beam hopping mode scheduling the first wireless device to switch between a plurality of candidate beam pairs over a plurality of symbols in accordance with a beam switching pattern; and beamforming, during the communication with the second wireless device, a beam of each of the plurality of candidate beams in accordance with the beam switching pattern.

B. The method as paragraph A recites, wherein configuring the beam hopping mode with the second wireless device, comprises: sending a beam hopping indication to the second wireless device, the beam hopping indication triggering a synchronization process between the first wireless device and the second wireless device to determine the plurality of candidate beams and/or the beam switching pattern.

C. The method as any of paragraphs A-B recite, wherein configuring the beam hopping mode with the second wireless device, comprises: sending, to the second wireless device, beam hopping configuration, the beam hopping configuration including the plurality of candidate beams and/or the beam switching pattern.

D. The method as paragraph C recites, further comprising measuring a signal strength of each of the plurality of candidate beams and selecting the plurality of candidate beams based on the signal strength of each of the plurality of candidate beams being greater than a configured signal strength threshold.

E. The method as any of paragraphs C or D recite, wherein the plurality of candidate beams includes a first candidate beam and second candidate beam, and further comprising: measuring a first steering angle of the first candidate beam; measuring a second steering angle of the second candidate beam; and selecting the first candidate beam and the second candidate beam based on a difference between the first steering angle and the second steering angle being greater than a configured steering angle difference threshold.

F. The method as any of paragraphs C-E recite, further comprising generating the beam switching pattern based on power consumption and/or thermal overhead observed at the first wireless device.

G. The method as any of paragraphs A-F recite, wherein configuring the beam hopping mode with the second wireless device, comprises: sending, to the second wireless device, beam hopping configuration or a beam hopping indication in response to determining a mobility value associated with the first wireless device is less than a configured threshold.

H. The method as paragraph A recites, wherein configuring the beam hopping mode with the second wireless device, comprises: receiving, from the second wireless device, beam hopping configuration from the second wireless device, the beam hopping configuration including the plurality of the candidate beams and/or the beam switching pattern.

I. The method as paragraph A recites, wherein configuring the beam hopping mode with the second wireless device, comprises: receiving, from the second wireless device, beam hopping configuration from the second wireless device, the beam hopping configuration including the plurality of the candidate beams, and further comprising: scanning the plurality of beams to determine the beam switching pattern.

J. The method as any of paragraphs A-I recite, wherein beamforming a beam of each of the plurality of candidate beams in accordance with the beam switching pattern comprises beamforming at least two of the plurality of candidate beams on different bandwidth parts of the same or different component carriers.

K. The method as paragraph J recite, further comprising detecting a frequency hopping context, and wherein beamforming the at least two of the plurality of candidate beams comprises beamforming at least two of the plurality of candidate beams on different component carriers based on the frequency hopping context.

L. The method as any of paragraphs A-K recite, wherein the plurality of candidate beams includes a first subset of candidate beams and a second subset of candidate beams, and beamforming a beam of each of the plurality of candidate beams in accordance with the beam switching pattern comprises: switching between each of the first subset of candidate beams for a first contiguous subset of the plurality of symbols, and switching between each of the second subset of candidate beams for a second contiguous subset of the plurality of symbols.

M. The method as any of paragraphs A-L recite, wherein the first wireless devices is a user equipment (UE) and the second wireless device is a base station.

N. The method as any of paragraphs A-L recite, wherein the first wireless devices is a base station and the second wireless device is a user equipment (UE).

O. The method as any of paragraphs A-N recite, wherein the first wireless device is a 5G new radio device operating at a millimeter wave frequency above 7.125 GHz.

P. A first wireless device for wireless communication, comprising a memory storing computer-executable instructions; and at least one processor coupled with the memory and configured to execute the computer-executable instructions to perform the method of any of paragraphs A-N.

Q. A first wireless device for wireless communication, comprising means for performing the method of any of paragraphs A-N.

R. A non-transitory computer-readable medium storing computer executable code, the code when executed by a processor causes the processor to perform the method of any of paragraphs A-N.

What is claimed is:

1. A method of wireless communication at a first wireless device, comprising:
    configuring, based on a mobility value, a beam hopping mode for communications with a second wireless device, the beam hopping mode scheduling the first wireless device to switch between a plurality of candidate beam pairs over a plurality of symbols in accordance with a beam switching pattern; and
    beamforming, during the communications with the second wireless device, a beam of each of the plurality of candidate beam pairs in accordance with the beam switching pattern.

2. The method of claim 1, wherein configuring the beam hopping mode with the second wireless device, comprises:
    sending a beam hopping indication to the second wireless device, the beam hopping indication triggering a synchronization process between the first wireless device and the second wireless device to determine the plurality of candidate beam pairs and/or the beam switching pattern.

3. The method of claim 1, wherein configuring the beam hopping mode with the second wireless device, comprises:
    sending, to the second wireless device, beam hopping configuration, the beam hopping configuration including the plurality of candidate beam pairs and/or the beam switching pattern.

4. The method of claim 3, further comprising:
    measuring a signal strength of each of the plurality of candidate beam pairs; and
    selecting the plurality of candidate beam pairs based on the signal strength of each of the plurality of candidate beam pairs being greater than a configured signal strength threshold.

5. The method of claim 3, wherein the plurality of candidate beam pairs includes a first candidate beam and second candidate beam, and further comprising:
    measuring a first steering angle of the first candidate beam;
    measuring a second steering angle of the second candidate beam; and
    selecting the first candidate beam and the second candidate beam based on a difference between the first steering angle and the second steering angle being greater than a configured steering angle difference threshold.

6. The method of claim 3, further comprising generating the beam switching pattern based on power consumption and/or thermal overhead observed at the first wireless device.

7. The method of claim 1, wherein configuring the beam hopping mode with the second wireless device, comprises:
    sending, to the second wireless device, beam hopping configuration or a beam hopping indication in response to determining the mobility value associated with the first wireless device is less than a configured threshold.

8. The method of claim 1, wherein configuring the beam hopping mode with the second wireless device, comprises:
    receiving, from the second wireless device, beam hopping configuration from the second wireless device, the beam hopping configuration including the plurality of candidate beam pairs and/or the beam switching pattern.

9. The method of claim 1, wherein configuring the beam hopping mode with the second wireless device, comprises:
    receiving, from the second wireless device, beam hopping configuration from the second wireless device, the beam hopping configuration including the plurality of candidate beam pairs, and further comprising:
    Scanning the plurality of candidate beam pairs to determine the beam switching pattern.

10. The method of claim 1, wherein beamforming a beam of each of the plurality of candidate beam pairs in accordance with the beam switching pattern comprises beamforming at least two of the plurality of candidate beam pairs on different bandwidth parts of a same or different component carriers.

11. The method of claim 10, further comprising detecting a frequency hopping context, and wherein beamforming the at least two of the plurality of candidate beam pairs comprises beamforming at least two of the plurality of candidate beam pairs on different component carriers based on the frequency hopping context.

12. The method of claim 1, wherein beamforming a beam of each of the plurality of candidate beam pairs in accordance with the beam switching pattern comprises:
    beamforming each of the plurality of candidate beam pairs for at least two contiguous symbols.

13. The method of claim 1, wherein the plurality of candidate beam pairs includes a first subset of candidate beams and a second subset of candidate beams, and beamforming a beam of each of the plurality of candidate beam pairs in accordance with the beam switching pattern comprises:
    switching between each of the first subset of candidate beams for a first contiguous subset of the plurality of symbols; and
    switching between each of the second subset of candidate beams for a second contiguous subset of the plurality of symbols.

14. The method of claim 1, wherein the first wireless device is a user equipment (UE) and the second wireless device is a base station.

15. The method of claim 1, wherein the first wireless device is a base station and the second wireless device is a user equipment (UE).

16. The method of claim 1, wherein the first wireless device is a 5G new radio device operating at a millimeter wave frequency above 7.125 GHz.

17. A first wireless device comprising:
    a memory; and at least one processor coupled to the memory and configured to:
  configure, based on a mobility value, a beam hopping mode for communications with a second wireless device, the beam hopping mode scheduling the first wireless device to switch between a plurality of candidate beam pairs over a plurality of symbols in accordance with a beam switching pattern; and
  beamform, during the communications with the second wireless device, a beam of each of the plurality of candidate beam pairs in accordance with the beam switching pattern.

18. The first wireless device of claim 17, wherein the at least one processor is configured to:
  measure a signal strength of each of the plurality of candidate beam pairs; and
  select the plurality of candidate beam pairs based on the signal strength of each of the plurality of candidate beam pairs being greater than a configured signal strength threshold.

19. The first wireless device of claim 17, wherein the plurality of candidate beam pairs includes a first candidate beam and second candidate beam, and the at least one processor is configured to:
  measure a first steering angle of the first candidate beam;
  measure a second steering angle of the second candidate beam; and
  select the first candidate beam and the second candidate beam based on a difference between the first steering angle and the second steering angle being greater than a configured steering angle difference threshold.

20. The first wireless device of claim 17, wherein to beamform a beam of each of the plurality of candidate beam pairs in accordance with the beam switching pattern, the at least one processor is configured to beamform at least two of the plurality of candidate beam pairs on different bandwidth parts of a same or different component carriers.

21. The first wireless device of claim 17, wherein the plurality of candidate beam pairs includes a first subset of candidate beams and a second subset of candidate beams, and to beamform a beam of each of the plurality of candidate beam pairs in accordance with the beam switching pattern, the at least one processor is configured to:
  switch between each of the first subset of candidate beams for a first contiguous subset of the plurality of symbols; and
  switch between each of the each of the second subset of candidate beams for a second contiguous subset of the plurality of symbols.

22. The first wireless device of claim 17, wherein the first wireless device is a user equipment (UE) and the second wireless device is a base station.

23. The first wireless device of claim 17, wherein the first wireless device is a base station and the second wireless device is a user equipment (UE).

24. The first wireless device of claim 17, wherein the first wireless device is a 5G new radio device operating at a millimeter wave frequency above 7.125 GHz.

25. A non-transitory computer-readable device having instructions thereon that, when executed by at least one first wireless device, causes the first wireless device to perform operations comprising:
  configuring, based on a mobility value, a beam hopping mode for communications with a second wireless device, the beam hopping mode scheduling the first wireless device to switch between a plurality of candidate beam pairs over a plurality of symbols in accordance with a beam switching pattern; and
  beamforming, during the communications with the second wireless device, a beam of each of the plurality of candidate beam pairs in accordance with the beam switching pattern.

26. The non-transitory computer-readable device of claim 25, wherein configuring the beam hopping mode with the second wireless device, comprises:
  receiving, from the second wireless device, beam hopping configuration from the second wireless device, the beam hopping configuration including the plurality of candidate beam pairs, and further comprising:
  scanning the plurality of candidate beam pairs to determine the beam switching pattern.

27. The non-transitory computer-readable device of claim 25, wherein beamforming a beam of each of the plurality of candidate beam pairs in accordance with the beam switching pattern comprises beamforming at least two of the plurality of candidate beam pairs on different bandwidth parts on a same or different component carriers.

28. The non-transitory computer-readable device of claim 25, wherein detecting a frequency hopping context, and wherein beamforming the at least two of the plurality of candidate beam pairs comprises beamforming at least two of the plurality of candidate beam pairs on different component carriers based on the frequency hopping context.

29. The non-transitory computer-readable device of claim 25, wherein beamforming a beam of each of the plurality of candidate beam pairs in accordance with the beam switching pattern comprises: beamforming each of the plurality of candidate beam pairs for at least two contiguous symbols.

30. The non-transitory computer-readable device of claim 25, wherein the plurality of candidate beam pairs includes a first subset of candidate beams and a second subset of candidate beams, and beamforming a beam of each of the plurality of candidate beam pairs in accordance with the beam switching pattern comprises:
  switching between each of the first subset of candidate beams for a first contiguous subset of the plurality of symbols; and
  switching between each of the second subset of candidate beams for a second contiguous subset of the plurality of symbols.

* * * * *